UNITED STATES PATENT OFFICE.

MARIUS MAGNARD, OF NEW YORK, N. Y.

PROCESS OF MAKING A PYROTECHNICAL COMPOSITION.

14,177. Specification of Reissued Letters Patent. Reissued Aug. 1, 1916.

No Drawing. Original No. 759,387, dated May 10, 1904, Serial No. 188,769. Application for reissue filed May 3, 1916. Serial No. 95,270.

*To all whom it may concern:*

Be it known that I, MARIUS MAGNARD, a citizen of the French Republic, residing at New York, in the county of New York and State of New York, have invented a certain new and Improved Process of Making a Pyrotechnical Composition, of which the following is a specification.

This invention relates to a new or improved pyrotechnical composition suitable for the manufacture of detonating fireworks and for other pyrotechnical purposes.

The novel composition, comprising my present invention, consists of a mixture of the following ingredients, preferably in the proportions stated, to wit:

| | | |
|---|---|---|
| Gum-arabic | 5. | kilograms |
| Carbonate of magnesium | 1.5 | kilograms |
| White phosphorus | 1. | kilogram |
| Red ocher | 2.5 | kilograms |
| Potassium chlorate | 3. | kilograms |

This composition is manufactured in the following manner: In five liters of water are mixed five kilograms of gum-arabic and 1.5 kilograms of carbonate of magnesium. This mixture is then heated to 50° centigrade, and one kilogram of white phosphorus is then added. The mixture is then allowed to cool to 25° under continuous stirring in order to obtain a very intimate mixture, after which 2.5 kilograms of red ocher and three kilograms of potassium chlorate are added. The product is preferably divided into small pieces and used for the manufacture of pyrotechnical articles.

I declare that what I claim is:—

1. A process for the production of a pyrotechnical compound consisting in mixing gum-arabic and carbonate of magnesium in water, heating the mixture, adding white phosphorus, allowing the mixture to cool under continuous agitation, adding red ocher and potassium chlorate, and finally dividing the product into small pieces.

2. A process for the production of a pyrotechnical compound consisting in mixing five kilograms of gum-arabic and 1.5 kilograms of carbonate of magnesium in five liters of water, heating the mixture to 50° centigrade, adding one kilogram of white phosphorus, allowing the mixture to cool under continuous agitation, adding 2.5 kilograms of red ocher and three kilograms of potassium chlorate, and finally dividing the product into small pieces.

In testimony, that I claim the invention set forth above I have hereunto set my hand this 29th day of April, 1916.

MARIUS MAGNARD.

Witnesses:
GEORGE D. RICHARDS,
EVA E. DESCH.